July 28, 1931. J. J. N. VAN HAMERSVELD ET AL 1,816,239
CHUCK CLOSING AND OPENING MECHANISM
Filed Dec. 5, 1927 6 Sheets-Sheet 1
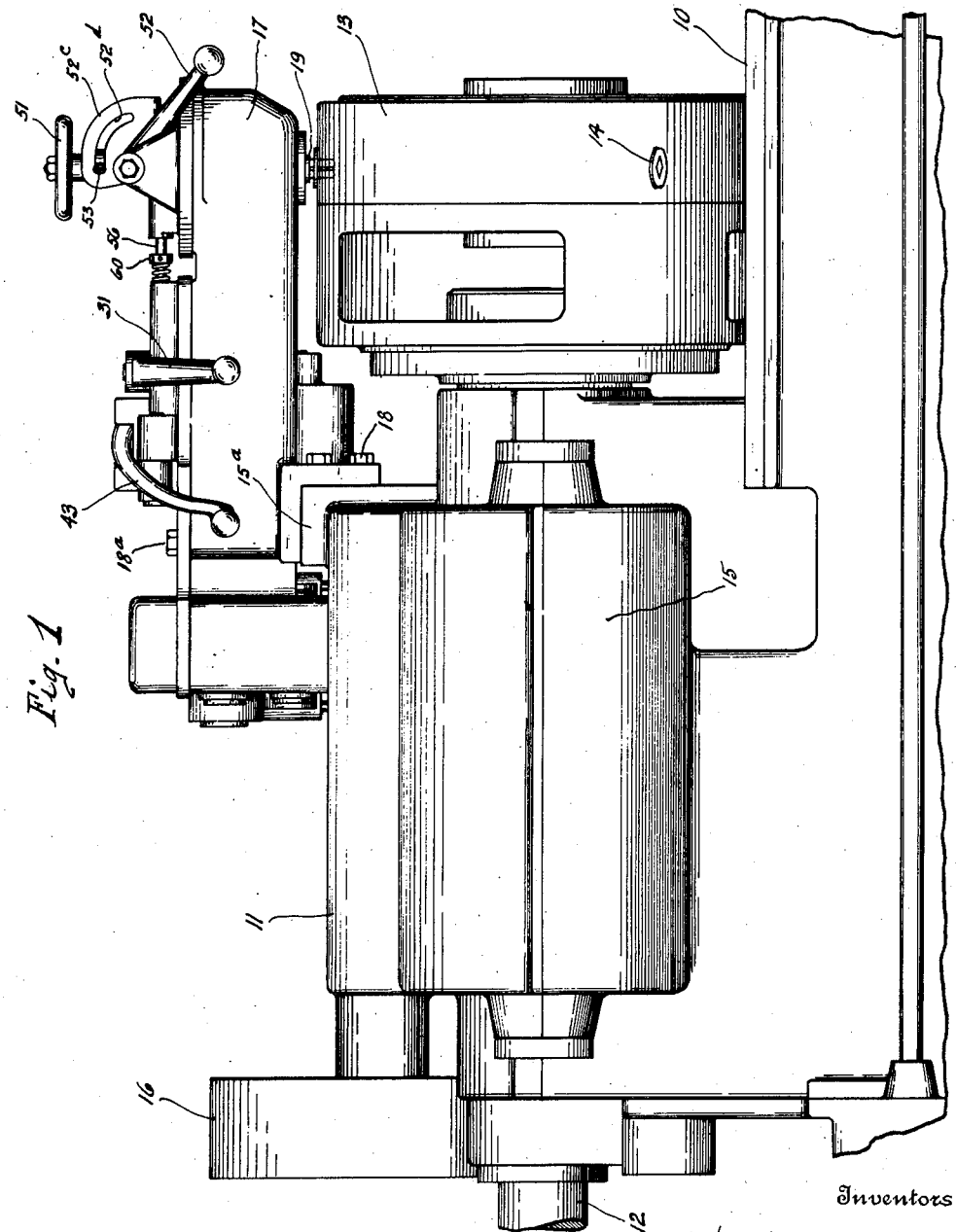
Inventors
John J. N. Van Hamersveld
Edward P. Burrell
By Kwis Hudson & Kent
Attorneys

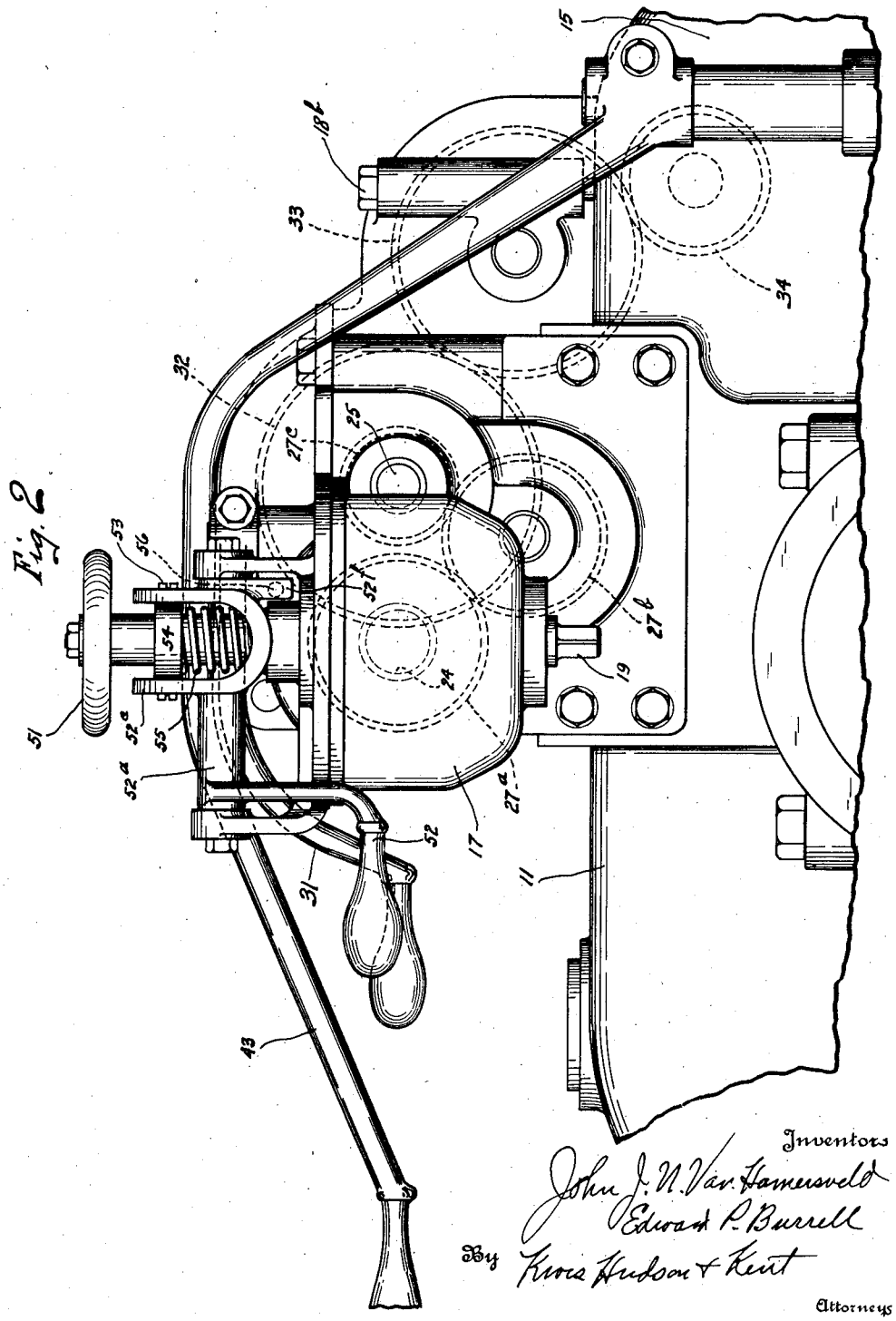

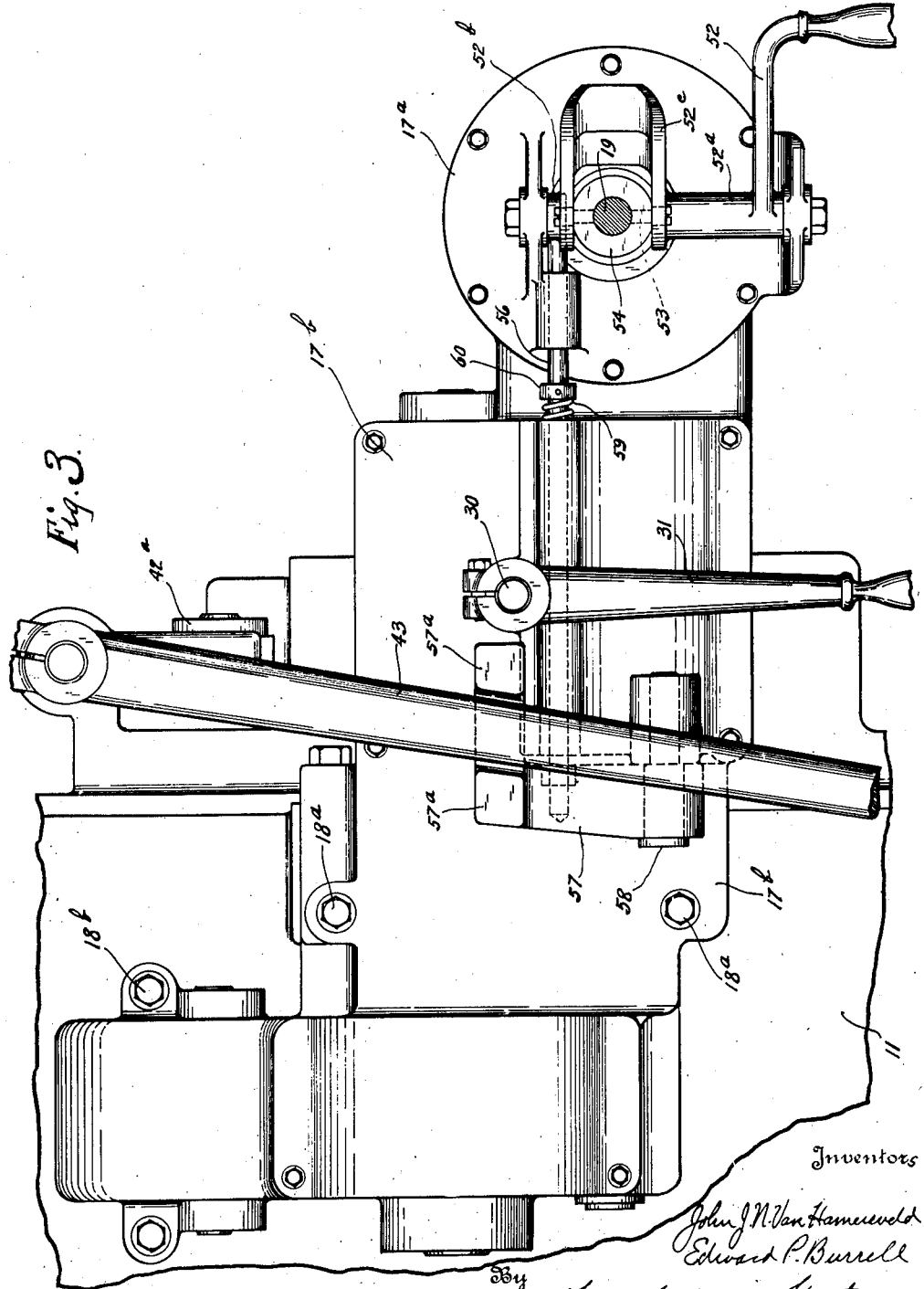

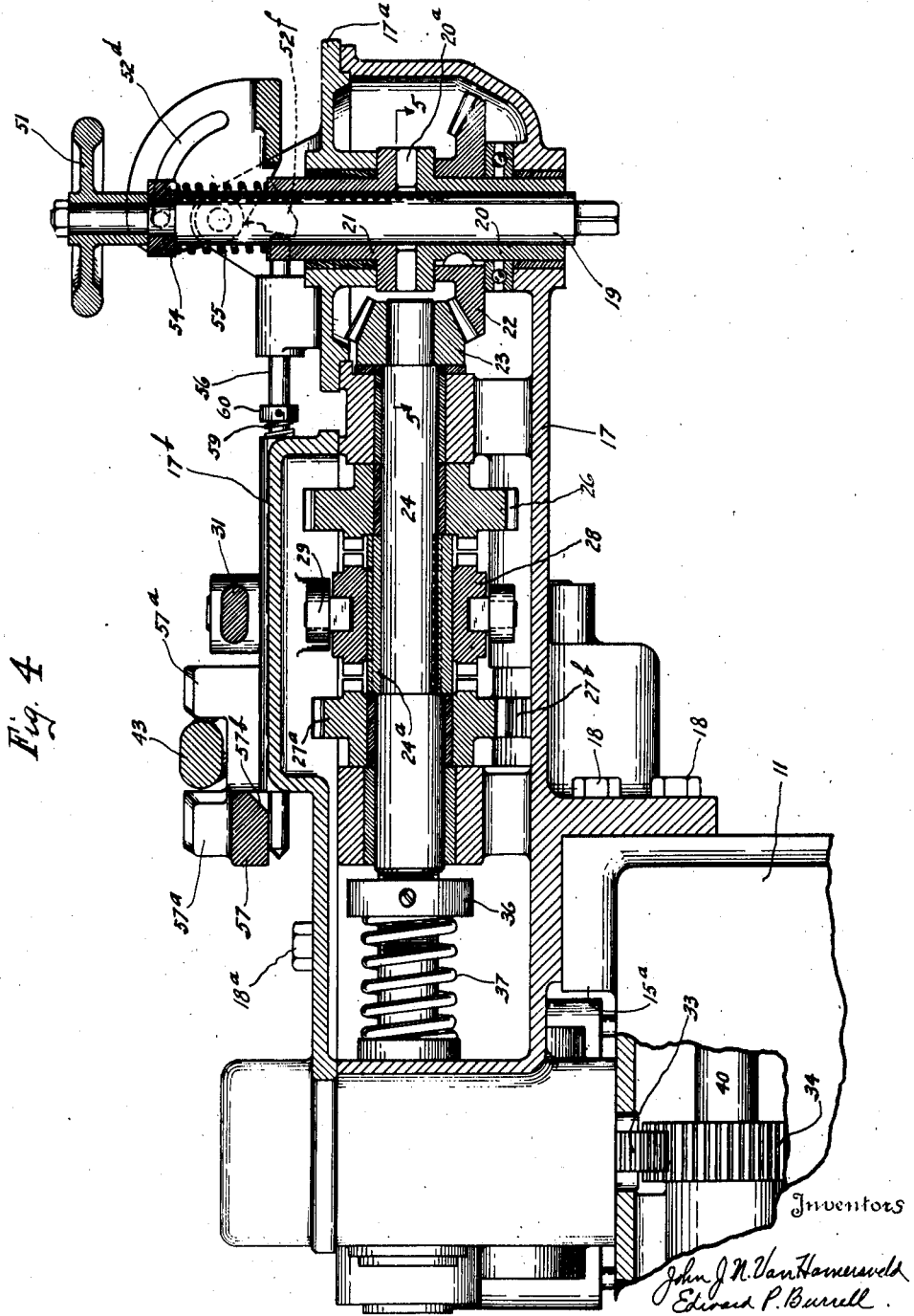

July 28, 1931.  J. J. N. VAN HAMERSVELD ET AL  1,816,239
CHUCK CLOSING AND OPENING MECHANISM
Filed Dec. 5, 1927  6 Sheets-Sheet 5
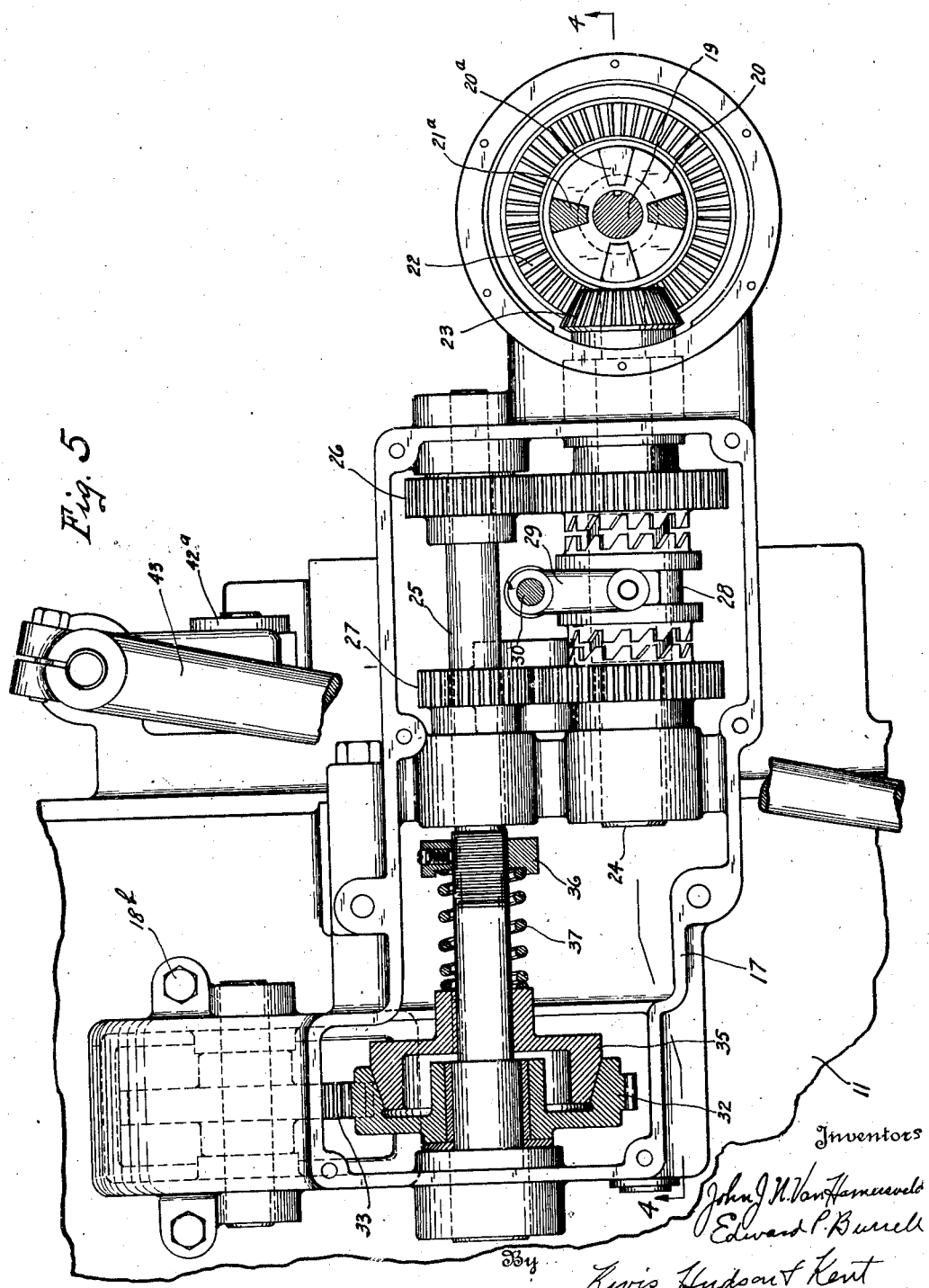

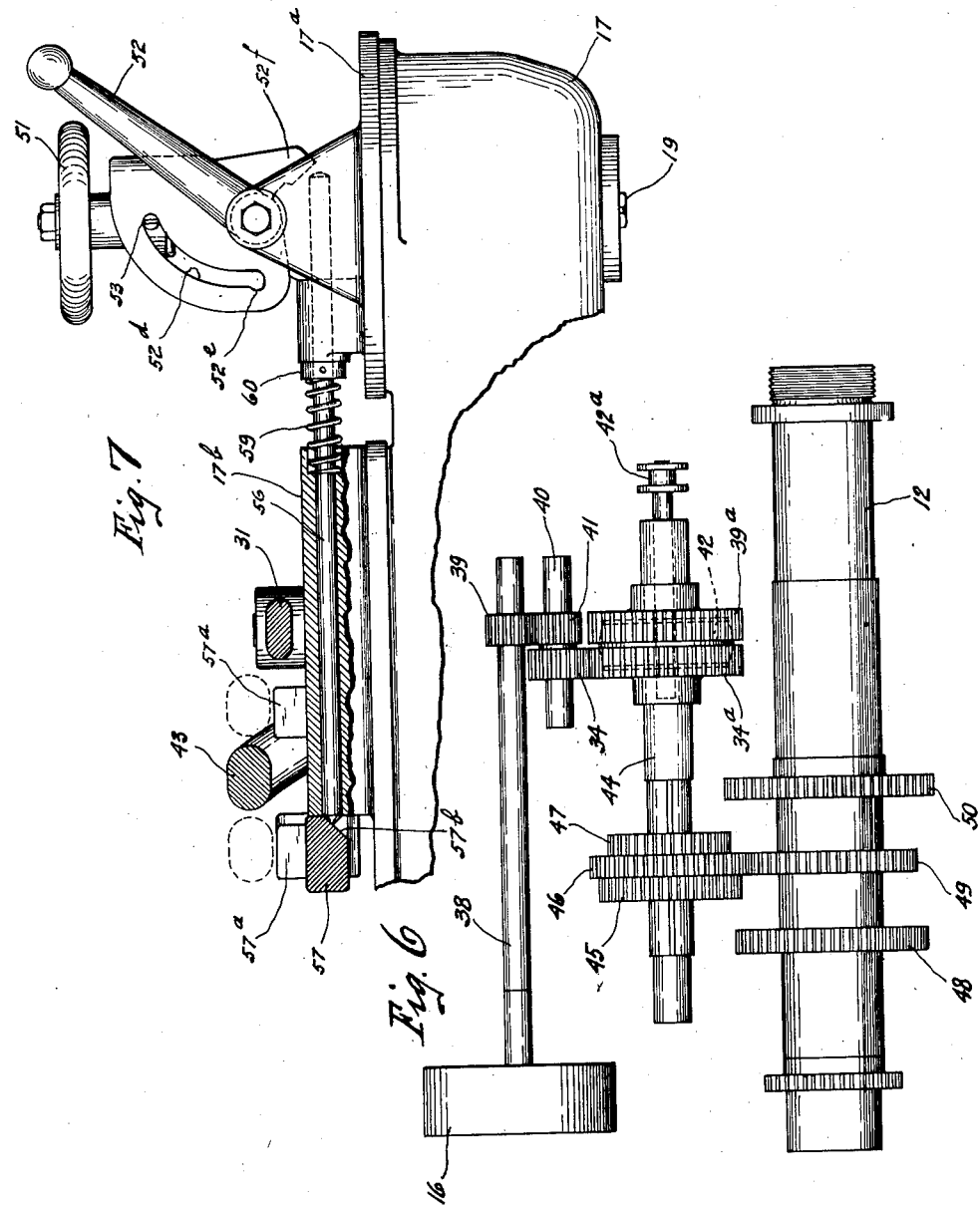

Patented July 28, 1931

1,816,239

UNITED STATES PATENT OFFICE

JOHN J. N. VAN HAMERSVELD, OF CLEVELAND HEIGHTS, AND EDWARD P. BURRELL, OF SHAKER HEIGHTS, OHIO, ASSIGNORS TO THE WARNER & SWASEY COMPANY, OF CLEVELAND, OHIO, A CORPORATION OF OHIO

CHUCK CLOSING AND OPENING MECHANISM

Application filed December 5, 1927. Serial No. 237,703.

This invention relates to power operated mechanism for closing and opening chucks which are adapted to grip or hold work pieces while the same are being machined. The present invention has utility for operating chucks generally regardless of their size because of its efficiency of operation, but it has additional advantages in connection with large chucks adapted for gripping large and heavy work pieces, for in the latter case it has been found that it is very difficult and that considerable time is required for a single workman to close the jaws onto the work piece with the necessary gripping action and to open the chuck by releasing the jaws from the work piece, with the workman using a wrench of suitable leverage.

The principal object of the present invention is to operate, i. e., to close and open the chuck by power driven mechanism by which the chuck may be closed or opened quickly, conveniently and safely.

A further object is to provide a chuck operating mechanism for the purpose stated, which can be applied as an attachment to machine tools, such at lathes, or which can be built into a machine tool as an integral part thereof.

A further object is to provide in connection with this mechanism certain safety features by which it is rendered impossible for the operator to start the rotation of the spindle which carries the chuck when the chuck opening and closing member is applied to the chuck, and also to prevent the application of this member to the chuck while the lever controlling the rotation of the spindle is not in neutral position.

Further, the invention aims to guard against injury to the chuck or to a work piece by disconnecting the transmission of power, or otherwise rendering the chuck operating member ineffective when the load transmitted through the chuck operating member exceeds a predetermined amount, which amount may be varied at will to suit the nature of the work.

A further aim of the invention is to provide for the automatic disengagement of the chuck operating member from the chuck in the event that this member which is generally in the form of a rotary wrench, is not fully and safely engaged with the part of the chuck which the wrench is adapted to turn to close or open the chuck.

Still further the invention aims to provide an attachment and to arrange the same in such a manner that the power for rotating the chuck operating member may be derived from an element utilized in rotating the spindle which carries the chuck, the particular element from which the power is derived being preferably one whose rotation is unaffected by the disengagement of the clutch which controls the rotation of the spindle.

The above and other objects are attained by the present invention, which may be here briefly summarized as consisting in certain novel details of construction and combinations and arrangements of parts which will be described in the specification and set forth in the appended claims.

In the accompanying sheets of drawings, we have shown one embodiment of the invention, wherein the mechanism involving the invention is in the form of an attachment to a head-stock of a lathe, the power for operating the chuck closing and opening member being obtained from the source of power which operates the machine, including the head-stock, and in this instance being connected to one of the gears utilized in rotating the spindle. However, the invention may be used to advantage on other types of machine tools, and is not necessarily connected to or operated by the power means for rotating the spindle.

In the accompanying sheets of drawings, Fig. 1 is a side elevation of the attachment applied to the head-stock of a lathe, the spindle of which is provided with a chuck, the head-stock, chuck and a portion of the bed also being shown in side elevation;

Figure 2 is a front elevation of the same, looking toward the left of Fig. 1, the parts being shown on a slightly enlarged scale;

Figure 3 is a top plan view with the hand-wheel on the chuck operating wrench removed;

Figure 4 is a longitudinal sectional view through the attachment and a portion of the head-stock, substantially along the line 4—4 of Fig. 5;

Figure 5 is a view similar to the plan view of Fig. 3, with certain cover plates removed and with portions in section substantially along the line 5—5 of Fig. 4;

Figure 6 is a detail view partly conventional or diagrammatic showing the principal elements of the head-stock employed for rotating the spindle which carries the chuck; and Figure 7 is a view similar to a portion of Fig. 1 with the hand lever for raising and lowering the wrench in a different position than shown in Fig. 1.

Referring now to the drawings, we have shown at 10 a portion of the bed of a lathe at the head end of which is mounted the head-stock which may be of usual or any suitable construction and is here designated generally by the reference character 11. The head-stock is provided with a rotary work spindle 12 to the forward end of which is applied a work holding chuck 13 adapted to support the work while it is being machined. The chuck also may be of any suitable construction and will have suitable work gripping jaws which are usually radially movable, and which are generally moved by actuating any one of a number of jaw actuating members spaced around the periphery of the chuck. In this instance, we have shown in elevation a chuck similar to that constituting the subject matter of a prior application of Bogart, Serial No. 229,896, filed October 31, 1927, wherein there are two sets of jaws operated by rotary scrolls in turn operated by pinions to the outer ends 14 of which (note Fig. 1) a wrench is adapted to be applied to turn the pinions in one direction or the other to close or open the chuck. A chuck of the type claimed in the prior application referred to is herein illustrated for convenience but a chuck of any other construction may be utilized.

The spindle and, therefore, the chuck are adapted to be rotated by a train of mechanism contained in the housing 15 of the head-stock, and this mechanism may be driven by any suitable source of power, such as a motor. In this instance, we have shown as the source of power a belt pulley 16 which may be rotated at a constant speed, not only to operate the spindle but is also generally utilized to actuate the tool carrying members in any usual or well-known manner.

As already stated, in the drawings we have shown the invention applied as an attachment to the head-stock. With this embodiment the attachment includes a housing 17, the rear portion of which is attached to the top of the housing 15 of the head-stock in the manner indicated in Figs. 1 to 5 which show the attachment resting upon a pad 15$^a$ at the top of the head-stock and secured to the front of the head-stock and to this pad by horizontal bolts 18, shown in Fig. 4, and by vertical bolts 18$^a$ shown in Fig. 3. Additionally, a portion of the housing 17 is extended laterally and is secured to the top of the head-stock housing 15 by vertical bolts 18$^b$ also shown in Fig. 3. In this manner the attachment is rigidly secured to the head-stock.

The rear part of the housing 17 overhangs a part of the head-stock housing and the latter is cut away at one point, shown in Fig. 4, to permit the transmission of power from one of the elements of the spindle drive in the head-stock to a driving member of the chuck opening and closing attachment. The front part of the housing 17 extends forwardly over the chuck, the forward portion being provided with a rotary chuck opening and closing member or wrench 19 which is arranged vertically as shown and has its lower end wrench-shaped so that it may be inserted when the member 19 is lowered, as hereinafter described, into the outer end 14 of any one of the pinions which are adapted to be turned to open and close the chuck. This chuck operating member 19 is mounted for both rotary and endwise movement and it is slidably mounted in two bushings 20 and 21 which are journaled in the front part of the housing 17 in vertical alignment, as best illustrated in Fig. 4. These bushings 20 and 21 are in the nature of a coupling having adjacent flanges, one being provided with a pair of upwardly projecting driving teeth or lugs 20$^a$ and the other having a pair of similar but downwardly extending teeth or lugs 21$^a$, note Figs. 4 and 5. By means of these lugs the drive may be transmitted from the lower bushing 20 to the upper bushing 21 and when the lugs engage a blow may be transmitted from the driving bushing to the driven bushing for a purpose to be explained presently. The chuck operating member 19 which is in the form of a spindle has a splined connection with the upper bushing 21 so that the rotation of the driven bushing 21 is transmitted to this spindle 19, the spline permitting the shaft to be raised and lowered.

The lower bushing 20 is provided with a bevel gear 22 which engages a bevel pinion 23 on a horizontal shaft 24 extending back through the housing 17. At the side of this shaft 24 is a second shaft 25 also located in the housing 17, note Fig. 5. The shaft 25 is adapted to drive the shaft 24 in both directions and, therefore, these shafts are connected by two sets of gears 26 and 27, the former composed of two gears directly in mesh with each other for rotating the chuck operating wrench 19 in one direction, and the set 27 consisting of a train of three gears, including an idler, the same being indicated by dotted lines in Fig. 2 and designated 27$^a$, 27ᵇ and 27ᶜ, for rotating the wrench 19 in the opposite direction.

On shaft 24 is a clutch 28 (see Figs. 4 and 5,) including a central movable clutch member which is keyed to the shaft and is adapted when in neutral position to stop the rotation of shaft 24 and, therefore, of the wrench 19 and when moved to the right or to the left to throw one of the other trains of gears 26 or 27 into operation. In this instance, for convenience of assembly of the gears and movable clutch member on shaft 24, the movable clutch member is keyed to a sleeve 24ᵃ which in turn is keyed to the shaft 24 and after assembly in effect constitutes a part of the shaft. The clutch 28 is adapted to be shifted manually and, accordingly, the movable clutch member is engaged by a shifting yoke 29 carried by a vertical stem 30 supported by the housing 17 and provided at its upper end above the housing with a clutch shifting lever 31, note Figs. 1, 2, 3 and 5.

The shaft 25 extends to the rear end of housing 17 and at its rear end is provided with a gear 32 which is adapted to be driven by one of the spindle driving elements of the head-stock, the gear 32 being shown by full lines in Fig. 5 and being indicated by dotted lines in Fig. 2. By reference to this last mentioned figure it will be noted that the gear is engaged by an idler 33 shown by dotted lines, this idler being supported by the lower rear part of the housing 17 of the attachment and extending down into the top of the housing 15 of the head-stock into engagement with a gear 34 constituting one of the elements of the spindle driving mechanism which is mounted in the head-stock and to be referred to presently in connection with the description of Fig. 6 where this gear is shown.

The gear 32 is not fixed to shaft 25 but it forms one element of a friction clutch, the other element of which is a friction member 35 which is keyed to and slidably mounted on shaft 25. Surrounding shaft 25 and arranged between the hub of the clutch member 35 and an adjustable collar 36 also mounted on shaft 25 is a spring 37 which normally tends to hold the clutch member 35 into frictional driving engagement with the combined gear and clutch member 32. The purpose of this friction clutch is to avoid overloading and, therefore, breakage of some part of the attachment for when the transmitted load exceeds a certain value, determined by the pressure of spring 37, and, therefore, by the position of collar 36, the two elements 32 and 35 will slip so as to prevent more than the predetermined load being transmitted. The collar 36 will be so positioned that the desired power will be transmitted. This will depend primarily upon the nature of the work piece in the chuck for obviously it controls the degree of gripping pressure of the jaws of the chuck upon the work piece. In closing the chuck by the power mechanism of this invention, the jaws will be run inwardly and when they engage the work piece with a certain pressure which can be controlled by adjusting the pressure of the spring 37, slippage occurs between the parts 32 and 35 so as to prevent this pressure being exceeded. Though this slipping member or friction clutch is very useful in the closing operation, it may, depending upon the nature of the chuck used, have utility also in the opening movement so as to avoid breakage if the jaws should be run outwardly too far.

The normal function and location of the particular spindle driving element, in this case the element 34, which is utilized in transmitting power to the chuck closing attachment will depend upon the design of the head-stock or of the spindle driving mechanism in the event that the attachment is applied to a machine which does not contain what is ordinarily known as a head-stock. In the case of a lathe or any other machine tool to which the chuck operating mechanism may be applied, there is always provided a clutch for connecting the spindle to or disconnecting it from the driving source or prime mover whether a motor or pulley for driving the spindle and other parts of the machine. It is, however, desirable, regardless of the design and arrangement of the parts of the spindle driving mechanism, that the element of the spindle driving mechanism which transmits power to the chuck operating mechanism be what is normally termed a constantly rotating member in the sense that its rotation is unaffected by the operation of the spindle controlling clutch, or in the sense that it rotates constantly and generally at a constant speed as long as the source of power or primary driving element, in this instance the pulley 16 is rotated. The reason for this is that it is essential to the successful operation of a power operated chuck opening and closing mechanism that the chuck be operated, i. e., closed or opened, when the work spindle is stationary, thus utilizing the source of power for closing or opening the chuck when the main spindle and chuck are stationary.

Though it is to be understod that my invention is not confined to a head-stock or spindle driving mechanism such as illustrated in Fig. 6, I have here illustrated a successful and well-known spindle driving mechanism which includes the following main elements. The pulley 16 is secured to a shaft 38 which as well as the remaining shafts to be referred to is journaled in the housing 15 of the head-stock. This shaft 38 is provided with a gear 39 which drives the clutch shaft 44 by means of two gear trains, one being through a direct geared connection between the gear 39 and the clutch gear 39a on the clutch shaft, and the other being through the geared connection of gear 39 to gear 41 on countershaft 40, and the other gear 34 on said countershaft to clutch gear 34a on the clutch shaft. The two sets of gears, therefore, will rotate the shaft 44 in opposite directions. Though gear 39 engages directly gear 39a, for convenience of illustration they are shown separated in Fig. 6, which is intended as a diagrammatic view. At this point it might be mentioned that the gear 34 which transmits power to the chuck operating mechanism is, in this instance, mounted on shaft 40 and constitutes one of the gears of the two sets or trains which transmit power from shaft 38 to shaft 44. Between these two sets of gears there is a clutch by which either train of gears may become the driving train for shaft 44. This clutch which is designated 42 is operated by clutch shifting member 42ᵃ connected to a lever 43 which in this instance extends over the top of the housing of the attachment and to the front side thereof, where it may be conveniently manipulated by the operator, as well illustrated in Figs. 1, 2, 3, 4 and 5 of the drawings. The position of this lever is here mentioned for the reason that it forms a part of an interlock to obtain the features of safety referred to in the early part of the specification, as will be described presently.

The shaft 44 has a sliding gear cone with gears 45, 46 and 47 adapted to mesh with gears 48, 49 and 50 on the spindle 12 to impart a plurality of different speeds to the spindle.

By this mechanism a plurality of speeds may be imparted to the spindle both for forward and reverse rotation and the spindle may be stopped by disengaging clutch 42 from either of the gears 34ᵃ or 39ᵃ, and when this clutch is disengaged the gear 34 continues its rotation at the constant speed, this being the element previously described which transmits power to the chuck operating attachment.

Reverting again to the forward end of the attachment, it will be observed that the chuck operating wrench or spindle 19 is provided at its upper end with a hand-wheel 51, by which the spindle may be turned manually if occasion should arise for the manual turning of the wrench, as, for example, when it is desired to position the wrench so that it will register with the opening in the part 14 of the chuck to be turned.

The wrench or spindle is adapted to be raised and lowered into and out of engagement with one of the jaw actuating members 14 of the chuck by a hand lever 52 which is pivotally supported on a cover plate 17ᵃ at the top of the front portion of the housing 17. The lever 52 has integrally formed therewith two sleeve-like hubs 52ᵃ and 52ᵇ which are spaced apart and are joined by a substantially U-shaped member 52ᶜ, each side of which is provided with a cam slot 52ᵈ illustrated in Figs. 1, 4 and 7. Engaging in these cam slots are a pair of screw pins 53 which project at diametrically opposite points from a collar 54 rotatably mounted on the wrench or spindle 19 and held between two shoulders, one formed on the spindle and the other formed by the hub of the hand-wheel 51. The cam slots 52ᵈ are so disposed that when the lever 52 is swung upwardly to the position shown in Fig. 7 the wrench spindle 19 is elevated and its lower end then clears the outer ends of the jaw actuating parts 14 of the chuck, but when the lever 52 is swung downward to the position shown in Fig. 1, the cam slots lower the spindle so that its lower wrench-shaped end may slide into one of the jaw actuating members 14, as shown in Fig. 1. A spring is provided for normally holding the spindle 19 in its elevated position, this spring being shown at 55 and being in this instance arranged around the spindle between the collar 54 and the upper end of bushing 21. When the spindle 19 is moved upwardly by the spring the action of the pins 53 in the cam slots 52ᵈ will at the same time cause the hand lever 52 to be swung upwardly to its normal inoperative position except when the hand lever 52 and the spindle 19 are in their lowermost positions, in which event the pins 53 will engage the ends of the slots, as indicated in Figs. 1 and 5, which are so formed at this point as to have a locking action, as clearly indicated at 52ᵉ in Fig. 7. The purpose or advantage of this arrangement whereby the spindle and hand lever will be returned to their normal inoperative positions except when the lever is swung to its lowermost position is to prevent the chuck being opened or closed when the wrench is only partly engaged with one of the jaw actuating members 14 of the chuck, thus avoiding the likelihood of breakage for this reason.

It will be observed further by reference particularly to Figs. 3, 4 and 7 of the drawings, that the U-shaped portion 52ᶜ of the hand lever is provided with an extension or heel 52ᶠ which when the hand lever 52 is pulled down is adapted to engage and move in an endwise direction a rod 56 which is slidingly supported on the cover plate 17ᵃ and on a second cover plate 17ᵇ of the attachment housing 17. It will be apparent that the hand lever 52 can be swung downward only in the event that the rod 56 is capable of free inward sliding movement. It might be stated at this point that this rod 56 forms one element of the interlock with the hand lever 43 which controls the rotation of the spindle. In carrying out this part of the invention, I provide means whereby the inward sliding movement of the rod 56 is prevented unless the hand lever 43 is in neutral position, which is the position which it occupies when the work spindle 12 and chuck 13 are stationary.

This is accomplished by a locking member 57 which is pivotally mounted by means of a pivot pin 58 on the top of the cover plate 17<sup>b</sup>, as best illustrated in Fig. 3 of the drawings. This locking member 57 has two upstanding fingers 57<sup>a</sup>, note particularly Figs. 3, 4 and 7, which fingers constitute a fork and are on opposite sides of the hand lever 43, as shown in Fig. 3, when this hand lever is in its neutral position. Additionally, the locking member 57 is provided between these fingers and the pivot pin 58 with a wedge-shaped or tapered portion 57<sup>b</sup> (see Figs. 4 and 7) which is in the path of movement of the endwise movable rod 56, the locking member being normally held with the upper ends of the fingers beneath the hand lever 43, as indicated in Fig. 7. When the rod 56 is slid inwardly by swinging lever 52 downward, the inner end of this rod will engage the tapered face 57<sup>b</sup> of the locking member and will wedge it upwardly so that the fork formed by the fingers 57<sup>a</sup> will straddle the lever 43 providing the lever is in its neutral position. This will permit the hand lever 52 to be swung downwardly to its lowermost position so that the lower end of the wrench may engage with one of the rotary parts 14 of the chuck, and as long as the parts occupy the positions stated, the described position being illustrated in Fig. 1, it will be impossible to shift the lever 43 in either direction from its neutral position. That is to say, it will me impossible to start the work spindle and chuck in rotation either forward or reverse.

On the other hand, if it should be attempted to swing downward the hand lever 52 and to lower the wrench spindle 19 when the lever 43 controlling the work spindle is out of neutral position, the lever will lie above one of the fingers 57<sup>a</sup> of the locking member 57, as indicated in dotted lines in Fig. 7, and thus prevent the upward movement of this locking member by the camming action of the rod 56. Furthermore, this obstructing of the endwise movement of the rod 56 and, therefore, obviously the downward movement of the hand lever 52, takes place before there has been any material downward movement of the spindle or wrench 19, and in fact the downward movement of the hand lever 52 and of the spindle 19 will under these conditions be stopped before the lower end of the wrench 19 is capable of engaging the jaw actuating member 14 of the chuck. In brief, this arrangement makes it impossible for the operator to engage the wrench with the chuck when the hand lever 43 is out of neutral position and also makes it impossible for the operator to start up the rotation of the spindle and of the chuck when the wrench 19 is engaged with the chuck.

When the operator swings the hand lever 52 upwardly so as to elevate the wrench and thereby disengage it from the chuck, the rod 56 is moved outwardly from beneath the locking member 57<sup>b</sup> by a spring 59 which surrounds the rod and engages a collar 60 thereon. When this occurs, the locking member 57 swings downwardly by gravity beneath the hand lever 43 which can then be shifted in either direction from neutral position.

The attachment as a whole and particularly the parts on the interior thereof are so designed that all the parts on the interior of the housing may be amply lubricated. The interior of the housing forms one chamber from the extreme outer end of the attachment to the inner end, and this may be provided with a quantity of lubricant which will stand at a suitable level and may travel back and forth lengthwise of the housing, the bearings and other parts being so designed as to permit an equalization of the oil level throughout the main part of the housing. Furthermore, inasmuch as the lower rear part of the housing 17 communicates through an opening formed in the top of the head-stock housing 15 any excess of lubricant applied to the attachment housing may overflow into the head-stock housing.

The operation of the attachment or of a machine with the attachment applied, is as follows: Assuming that the pulley 16 is being rotated, when the main clutch 42 which controls the spindle 12 is disengaged all of the parts of the head-stock are stationary with the exception of the shaft 38, gear 39 and the two trains of gears to the clutch gears 34<sup>a</sup> and 39<sup>a</sup>, one of these trains including the gear 34 which transmits power to the chuck operating attachment. Assuming that the hand lever 52 which raises and lowers the wrench spindle 19 is in its upper or normal position, the operator may rotate the spindle and chuck in either direction by manipulating the lever 43. When it is desired to use the attachment to open or close the chuck, the operator must stop the rotation of the spindle and chuck by moving the hand lever 43 to neutral position. He will then swing the hand lever 52 downwardly and cause the lower end of the wrench spindle 19 to engage any one of the jaw actuating devices 14 of the chuck after having first aligned the wrench spindle and the device 14. To bring about the registration of the lower end of the wrench spindle with the socket in the part 14 of the chuck, the operator may turn the hand-wheel 51. When the wrench has been fully engaged with the member 14 of the chuck, the operator will swing the hand lever 31 in the proper direction so as to engage clutch 28 which controls the rotation of the wrench spindle 19. He will move the hand lever 31 in one direction for closing the chuck and in the other direction for opening it. Assuming that the chuck is being closed on the work piece, the jaws will be run inward until they engage the work piece with the predetermined or desired pressure, and when this pressure is reached, the transmission of power is interrupted by the slippage occurring between the clutch members 32 and 35. The operator will then restore the hand lever 31 to neutral position and will swing the hand lever 52 upwardly so as to disengage the wrench spindle 19 from the chuck. The spindle and chuck may then be rotated to machine the work piece.

When the operator desires to open the chuck, the work spindle and chuck must first be stopped and then the operation is repeated but the hand lever 31 controlling clutch 28 will, of course, be thrown in the opposite direction to that employed when the operator closed the chuck.

In starting the wrench spindle 19 in operation, the lower bushing 20 is rotated and it will rotate a certain amount before the driving lugs 20$^a$ thereof engage the lugs 21$^a$ of the upper bushing 21. This will impart a hammer blow to the driven lugs 21$^a$ and will give a sudden starting blow or torque to the spindle 19, this being especially desirable to initiate the opening movement of the chuck for it is well known that when a chuck has once been closed on a work piece with considerable pressure more power is required to open the chuck than to close it. However, with our invention the blow and therefore the sudden application of power result in the chuck being opened without the transmitted power exceeding the value or amount determined by the setting of the collar 36 and the pressure of the spring 37.

The safety features whereby it is impossible to start the work spindle and chuck in operation while the wrench spindle is in engagement with the chuck and whereby it is impossible to lower the wrench spindle into engagement with the chuck when the work spindle and chuck are rotating or when the lever controlling the work spindle is not in neutral position have been explained at considerable length above and will be understood without further description. The same is true of that safety feature whereby the wrench spindle will be automatically elevated out of engagement with the chuck as soon as the operator removes his hand from the hand lever 52 unless the wrench has been fully engaged with the jaw actuating part 14 of the chuck.

It will be seen from the above description that all of the objects stated at the beginning of the specification have been attained in a very effective manner by the construction herein described. However, we do not wish to be confined to the details or arrangements herein illustrated and described nor to the particular type of machine tool herein illustrated nor to the particular way of applying the chuck operating attachment, but aim in our claims to cover all modifications which do not involve a departure from the spirit and scope of the invention in its broadest aspects.

Having thus described our invention, what we claim is:

1. In a machine tool, a work holding chuck, a member for closing and opening the chuck, power means for rotating the chuck and means for operating said member from a power driven element of said means including a part which slips relative to a companion part when a predetermined load is transmitted to said member, and adjustable means whereby said predetermined load may be varied.

2. The combination with a power driven work holding chuck of a chuck closing and opening member, power mechanism for operating said member in opposite directions to close and open the chuck and including members having a lost motion connection so that a blow will be imparted by one to the other to start the chuck operating movement, said first named member being movable toward and from the chuck.

3. A chuck closing and opening mechanism for a machine tool having a rotary chuck comprising two shafts at right angles to each other, one constituting a driving shaft for the chuck closing and opening mechanism and the other a chuck closing and opening wrench, the latter being endwise movable at right angles to the axis of the chuck to cause it to engage and disengage a part of the chuck.

4. In combination with a machine tool having a power driven chuck, a power operated means for closing and opening the chuck comprising a rotary member, means for moving the said member to cause it to engage a jaw actuating element of the chuck, and means for automatically separating said member and element if they are not fully engaged.

5. In combination with a machine tool having a power driven chuck, power driven means for closing and opening the chuck comprising a member adapted to engage a jaw actuating element of the chuck, and a manually operable member for shifting said first member toward the chuck and having a camming connection therewith including a cam movable with the lever having a cam surface and a part movable with the said member and engaging said surface.

6. In combination with a machine tool having a power driven chuck, power driven means for closing and opening the chuck comprising a member adapted to engage a jaw actuating element of the chuck, a manually operable member for shifting said first member toward the chuck, a cam associated with the manually operable member and connected with the first member to shift the same, and means for moving said first member outwardly away from the chuck and for shifting said manually operable member to normal position.

7. The combination with a machine tool having a power driven rotary chuck, of power means for closing and opening the chuck comprising a wrench spindle, and means for rotating the same including a pair of members constituting a coupling having a lost motion connection for delivering a hammer blow and one being adapted to be driven by a member which rotates the chuck.

8. The combination with a machine tool having a power rotated chuck, of power operated chuck closing and opening means including a wrench spindle, and means comprising a pair of aligned sleeves for supporting the spindle and for rotating it, said sleeves having a driving connection with each other and one having a driving connection with the spindle.

9. The combination with a machine tool having a power rotated chuck, of power operated chuck closing and opening means including a wrench spindle, and means comprising a pair of aligned sleeves for supporting the spindle and for rotating it, said sleeves having a lost motion connection with each other and one having a driving connection with the spindle.

10. The combination with a machine tool having a power rotated chuck, of power operated chuck closing and opening means comprising a wrench spindle, a pair of sleeves constituting a coupling through which the spindle extends and is slidingly supported, and means for rotating one of said sleeves, the other having a driving connection with the spindle.

11. In a machine tool having a power rotated work holding chuck, an endwise movable wrench spindle for closing and opening the chuck and movable laterally with respect to the chuck axis into and out of the periphery of the chuck, and power means for rotating the spindle.

12. The combination with a machine having a rotating chuck, of power means for closing and opening the chuck comprising a member adapted to engage a jaw actuating element of the chuck and movable laterally with respect to the axis of the chuck into and out of engagement with said element.

13. The combination with a machine having a rotary chuck, of power means for closing and opening the chuck comprising a member adapted to engage a jaw actuating element of the chuck and movable toward and away from said element and into and out of the periphery of the chuck in a plane at substantially right angles to the axis of rotation of the chuck.

14. The combination with a machine having a head-stock including a spindle adapted to receive a chuck and power means for rotating the spindle, of a self-contained chuck closing and opening attachment including a housing secured to a part of said machine and a chuck closing and opening member, and means for actuating the same connected to the power means of the head-stock.

15. The combination with a machine tool having a head-stock including a rotary spindle to which a chuck may be applied and driving elements for the spindle within the head-stock, of a chuck closing and opening attachment secured to the head-stock and provided with a chuck closing and opening member, and means for actuating it including a member adapted to be driven by one of the spindle driving elements.

16. The combination with a machine tool having a head-stock including a spindle to which a chuck is adapted to be applied and including spindle driving elements and a clutch for engaging and disengaging certain of the elements so that the spindle rotation may be controlled, of a power operated chuck closing and opening attachment applied to the head-stock and including a member engageable with a jaw actuating element of the chuck, and means for rotating said member including a part engaging one of the spindle driving elements in the head-stock which element is rotated when said clutch is disengaged.

17. The combination with a machine tool having a head-stock including a spindle adapted to receive a chuck and power means for rotating the spindle, of a power operated chuck closing and opening attachment comprising a housing secured to a part of said machine and having a chuck closing and opening member, and power operated means for actuating it.

18. The combination with a machine tool having a head-stock including a spindle adapted to receive a chuck and power means for rotating the spindle, of a power operated chuck closing and opening attachment comprising a housing secured to a part of said machine and having a chuck closing and opening member, and power operated means for actuating it and including an element connected to one of the spindle rotating elements of the head-stock.

19. In combination with a machine tool having a head-stock with a spindle and mechanism within the head-stock for rotating it, a chuck on the spindle, and power means for opening and closing the chuck and including a housing projecting from the head-stock and overhanging the same, said housing carrying at its projecting end a chuck closing and opening member adapted to be applied to and removed from the chuck and containing power actuated means for operating said member, said power actuated means being connected to the spindle rotating mechanism of the head-stock.

20. The combination with a machine having a rotary chuck and power means for rotating the chuck including a clutch and a control lever for acuating it, of means for closing and opening the chuck comprising a rotary wrench member movable into and out of engagement with a jaw actuating element of the chuck, a control member for the wrench element, and means forming an interlock between said control member and said lever comprising an interlocking member which is shifted by said control member.

21. The combination with a machine tool having a chuck and power means for rotating it including a clutch and a clutch lever controlling it, of means for closing and opening the chuck including a rotary wrench member, a control member therefor, and an interlock between said clutch lever and said control member, including a rocking element for preventing the actuation of the lever when said control member is actuated.

22. The combination with a machine having a rotary chuck and power means for rotating it including a clutch and a control lever therefor, of means for closing and opening the chuck including a rotary wrench member, a control member for the wrench member, and an interlock between said control member and said control lever including a rocking member for holding the control lever against movement, and a second member which is shifted by the control member so as to hold the rocking member against movement.

23. In a machine tool, a work holding chuck, a member for closing and opening the chuck, power means for rotating the chuck, and means for operating said member from a power driven element of said means, including a clutch by which the operation of said member may be controlled, and including also a part which slips relative to a companion part when a predetermined load is transmitted to said member.

24. In a machine tool, a work holding chuck, a member for closing and opening the chuck, power means for rotating the chuck, and means for operating said member from a power driven element of said means, including a clutch by which the operation of said member may be controlled and a part which slips relative to a companion part when a predetermined load is transmitted to said member, and adjustable means whereby the load at which one of said parts slips relative to the other may be varied.

In testimony whereof, we hereunto affix our signatures.

JOHN J. N. VAN HAMERSVELD.
EDWARD P. BURRELL.

DISCLAIMER 1,816,239.—*John J. N. Van Hamersveld*, Cleveland Heights, and *Edward P. Burrell*, Shaker Heights, Ohio. CHUCK CLOSING AND OPENING MECHANISM. Patent dated July 28, 1931. Disclaimer filed August 5, 1933, by the assignee, *The Warner & Swasey Company*.

Hereby enters this disclaimer to claims 1, 14, 15, 16, 17, 18, 23, and 24 of said Patent No. 1,816,239.

[*Official Gazette August 29, 1933.*]